Jan. 19, 1926.
K. A. LEBBINK
1,570,265
ELECTRODE FOR DISCHARGE TUBES
Filed July 5, 1923
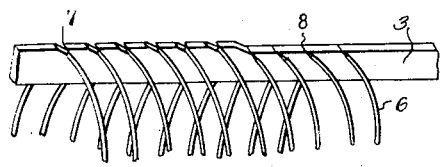
Inventor.
Karel August Lebbink
E. T. & J. F. Brandenburg
Attorneys.

Patented Jan. 19, 1926.

1,570,265

UNITED STATES PATENT OFFICE.

KAREL AUGUST LEBBINK, OF EINDHOVEN, NETHERLANDS, ASSIGNOR TO NAAM-LOOZE VENNOOTSCHAP PHILIPS' GLOEILAMPENFABRIEKEN, OF EINDHOVEN, NETHERLANDS.

ELECTRODE FOR DISCHARGE TUBES.

Application filed July 5, 1923. Serial No. 649,517.

*To all whom it may concern:*

Be it known that I, KAREL AUGUST LEBBINK, a subject of the Queen of the Netherlands, residing at Eindhoven, in the Province of North Brabant, in the Kingdom of the Netherlands, have invented certain new and useful Improvements in or Relating to Electrodes for Discharge Tubes, of which the following is a specification.

This invention relates to electrodes for electric discharge tubes, said electrodes being particularly adapted for the grids of tubes provided with three or more electrodes.

It is known to make grids for three electrode tubes by winding a wire of tungsten for example in adjacent coils on a frame or on one or more supports or supporting rods.

In doing so the successive coils should be properly affixed to the supporting rods to prevent displacement of the coils and the practice is to effect this attachment by soldering or welding or by lacing with a thin wire.

This known process is laborious and the attachment realized is in many cases unsatisfactory.

The present invention has for its principal object to simplify and improve the manner in which the coils are attached to the supports so that an uniform and well-finished final product is easily ensured.

The electrode according to the invention comprises a wire and at least one support for said wire, the wire being inserted in slots provided in said supports and teeth lying between the slots being bent over so as to lock the wire. Obviously the wire may also be shaped for example as a band.

According to another feature of the invention and in order to facilitate the bending of the teeth, the slots in the supports are preferably cut in under an angle which is smaller than 90°.

In the manufacture of electrodes according to the invention, the supports may be inserted in the longitudinal grooves of a mandril, whereupon the slots are helicoidally cut in the supports. The wire is then wound in the slots, the latter being finally closed by bending the intermediate teeth.

The electrode according to the invention is particularly adapted for use in discharge-tubes used as generating-tubes or receiving tubes in wireless telegraphy or telephony. In some cases it may be applicable as an anode but generally it is more adapted to serve as a grid in tubes of the said kind.

The invention will now be described in detail by reference to the accompanying drawing. The said drawing represents on a large scale a perspective view showing the wire helix embedded in the slots between the teeth 7 according to the invention.

The wire 6 may be of any suitable ductile material. Tungsten, molybdenum or nickel for example are suitable for the purpose.

The supports are preferably of an easily workable material which is not brittle. Nickel has proved to be suitable for the purpose. When bending the teeth between the slots no difficulty is encountered when using the said metal.

To the left of line $a$—$b$, the slots are shown as shaped before inserting the wire. As shown in the said figure the slots are cut in under an angle smaller than 90°. In a particular case an angle of cutting of say 75° may be suitable, but generally it depends on the shape and size of the teeth and slots.

When cutting the slots in this manner, it is easier to bend the teeth such that they hold the wire in the slots.

After the wire has been inserted in the slots, the teeth are bent and thus the construction shown to the right of the line $a$—$b$ is realized, the wires 6 being locked between the teeth 7 and the bent ends 8.

The electrode according to the invention can be made in various manners, for example by first cutting the slots in one or various adjacent supports, whereupon the latter may be inserted in grooves of a mandril which is adapted to be inserted in a lathe. If the supports are inserted and attached such that the slots follow a helical line it is possible for the wire to be quite easily wound from a reel on the supports.

Simpler is another process according to the invention by which the supports are inserted at once in the grooves of a mandril.

In the mandril which is adapted to be inserted in a lathe, longitudinal grooves are cut out, in which the supports are inserted, which for example are connected together by a ring. It will be apparent that the grooves in the mandril are provided in such a manner that the supports will take up the position which they keep in the finished electrode.

The mandril with supports is tightened in a lathe and the slots are cut in the supports along a helical line by a travelling chisel, preferably under an angle smaller than 90°. The slots may also be sawn or hewed.

Finally the bending of the teeth can be effected by careful hammering, by compression or by passing a hard object under pressure along the supports or by heat, whereby the teeth enclose the slots wholly or in part.

The product thus treated is slid as a whole from the mandril. If desired, the supports are connected together by a second ring or a plate and the electrode is finished, the wire being so clamped as to make a displacement during the operation of the electrode out of the question.

What I claim is:—

1. An electrode for electric discharge tubes comprising a wire and at least one support for said wire, the wire being inserted in slots provided in said support and teeth lying between the slots being bent over so as to lock the wire.

2. An electrode for electric discharge tubes comprising a coiled wire wound on at least one support, the windings of said wire being embedded in slots and the teeth between said slots being bent over so as to lock the windings.

3. An electrode for electric discharge tubes comprising a wire and at least one support for said wire, the wire being inserted in slots being cut in said support under an angle which is smaller than 90° and teeth lying between the slots being bent over so as to lock the wire.

In testimony whereof I have hereunto set my hand this 14th day of June 1923.

KAREL AUGUST LEBBINK.